United States Patent
Bauer et al.

(10) Patent No.: US 7,948,373 B2
(45) Date of Patent: May 24, 2011

(54) METHOD FOR REDUCING POWER CONSUMPTION OF SENSORS

(75) Inventors: Daniel Nikolaus Bauer, Birmensdorf (CH); John G. Rooney, Zurich (CH); Paolo Scotton, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 11/948,495

(22) Filed: Nov. 30, 2007

(65) Prior Publication Data

US 2008/0150714 A1 Jun. 26, 2008

(30) Foreign Application Priority Data

Nov. 30, 2006 (EP) .................................. 06125102

(51) Int. Cl.
| | |
|---|---|
| G08B 29/00 | (2006.01) |
| G08B 23/00 | (2006.01) |
| G08B 1/08 | (2006.01) |
| G08C 19/16 | (2006.01) |
| G08C 17/00 | (2006.01) |
| H04J 3/00 | (2006.01) |
| H04B 7/00 | (2006.01) |

(52) U.S. Cl. .................. 340/539.22; 340/506; 340/508; 340/511; 340/517; 340/523; 340/539.1; 340/870.01; 340/870.11; 370/311; 370/314; 370/343; 370/345; 370/349; 455/507; 455/515; 455/517; 455/526

(58) Field of Classification Search ................. 340/506, 340/508, 511, 517–523, 870.01, 870.11, 340/539.1; 370/311, 314, 343–349; 455/507–526
See application file for complete search history.

(56) References Cited

U.S. PATENT DOCUMENTS

| | | | | |
|---|---|---|---|---|
| 7,020,501 | B1 * | 3/2006 | Elliott et al. ................... | 455/574 |
| 7,230,528 | B2 * | 6/2007 | Kates ............................ | 340/521 |
| 7,302,362 | B2 * | 11/2007 | Misra et al. ................... | 702/182 |
| 7,318,010 | B2 * | 1/2008 | Anderson ..................... | 702/188 |
| 2005/0122231 | A1 * | 6/2005 | Varaiya et al. ............ | 340/870.01 |
| 2005/0122233 | A1 * | 6/2005 | Isoyama et al. ........... | 340/870.11 |
| 2006/0215583 | A1 * | 9/2006 | Castagnoli .................... | 370/254 |

* cited by examiner

*Primary Examiner* — Benjamin C Lee
*Assistant Examiner* — Lam P Pham
(74) *Attorney, Agent, or Firm* — William Stock; Anne Vachon Dougherty (57) ABSTRACT

A method for reducing power consumption of sensors (2) within a sensor network (1), wherein a central controller (3) calculates a transmission schedule for said sensors (2) on the basis of a correlation between sensor data transmitted from said sensors (2) to the central controller (3).

14 Claims, 9 Drawing Sheets

METHOD FOR REDUCING POWER CONSUMPTION OF SENSORS

FIELD OF THE INVENTION

The invention relates to a method for reducing power consumption of sensors within a sensor network, in particular, in a wireless sensor network.

BACKGROUND OF THE INVENTION

A sensor device produces an output signal in response to a specified measurement. There are terms which are often used synonymously for sensors, such as transducers and detectors. A transducer is more generally defined as a device which converts energy from one form to another. An output signal refers to an optical, electronic or mechanical signal. There are many different kinds of sensors, such as mechanical, electrical, magnetic or chemical sensors. Active sensors use an input power to accomplish transduction. Some sensors employ multiple transduction mechanisms in order to produce an electronic output signal in response to the measurement. The sensor detects the state or condition of some underlying system and transmits information about said state to some higher level entity.

As the implementation of processors has become cheaper, it is now possible to package the sensor hardware with a micro-processor and a transceiver into a single device. Accordingly, sensors can comprise a sophisticated programmable logic. This allows, for example, determining under which circumstances the sensor is read and which information is transmitted.

Previously-proposed low end sensor units are typically battery-powered allowing them to execute a measurement in environments where cabling would be unfeasible or prohibitively expensive. Previously-proposed protocols and software that runs on such sensors are designed for the reduced power consumption of such sensors in order that the batteries of the sensors have to be replaced with reduced frequency. In particular, as the radio power varies with the square of distance, such sensors form typically a network where messages from sensors are forwarded across other sensors to reach a destination device processing these sensor data. Accordingly, the radio or transceiver unit of such a sensor constantly draws power from the power source of the sensor, even when the sensor is idling.

Consequently, in a previously-proposed energy efficient network, the data communication protocols are designed to allow the transceiver of the sensor to be put to sleep as often as possible.

However, a disadvantage of such sensor networks resides in that, when the sensor only rarely sends sensor data to the processing unit the processed sensor data is outdated so that the system does not react to the actual state of the environment.

Accordingly, it is desirable to provide a method for reducing the power consumption of sensors within a sensor network and preserving integrity of the sensor network at the same time.

SUMMARY OF THE INVENTION

According to an embodiment of a first aspect of the present invention, there is provided a method for reducing power consumption of sensors within a sensor network, wherein a central controller calculates a transmission schedule for the sensors on the basis of a correlation between sensor data transmitted from the sensors to the central controller.

In an embodiment of the present invention, the sensors transmit in an initial learning phase sensor data independently to the central controller.

In an embodiment of the present invention, the central controller calculates on the basis of the received sensor data a correlation between the sensors.

In an embodiment of the present invention, the central controller calculates the transmission schedule which is made up of time periods, such that sensors with a high correlation, i.e. having a correlation coefficient exceeding a predetermined adjustable threshold value, do not transmit sensor data to the central controller during the same time period.

In an embodiment of the present invention, the central controller assigns transmission periods to each sensor transmitting sensor data to the central controller according to the calculated transmission schedule.

In an embodiment of the present invention, sensors with a high correlation are assigned by the central controller occasionally the same transmission period for transmitting sensor data to monitor whether the previous calculated correlation between the sensors is still valid.

In an embodiment of the present invention, the central controller determines that a correlation between sensors is no longer valid when the difference between the actual calculated correlation and the previous correlated correlation exceeds a threshold value.

In an embodiment of the present invention, the central controller recalculates a transmission schedule when the correlation between two sensors is no longer valid.

In an embodiment of the present invention, the calculated transmission schedule is flooded, e.g. broadcasted, by the central controller to the sensors.

In an embodiment of the present invention, each sensor stores the determined sensor data locally when the sensor is not transmitting the sensor data to the central controller.

In an embodiment of the present invention, the sensor data of a non-transmitting first sensor are interpolated from the sensor data of at least one transmitting second sensor which has a high correlation with the first sensor.

In an embodiment of the present invention, when it is determined that a correlation between two sensors is no longer valid, the central controller requests both sensors to transmit the locally stored sensor data to the central controller.

In an embodiment of the present invention, the sensor network comprises a wireless sensor network.

According to an embodiment of the present invention, there is further provided a method for reducing power consumption of sensors within a sensor network comprising the following steps:

transmitting in an initial learning phase sensor data from the sensors independently of each other to a central controller;

calculating on the basis of the sensor data received by the central controller a correlation between the sensors;

calculating a transmission schedule made up of time periods, such that sensors with a high correlation having a correlation coefficient exceeding a predetermined adjustable threshold value, do not transmit sensor data to the central controller during the same time period; and assigning transmission periods to each sensor for transmitting sensor data according to the calculated transmission schedule.

According to an embodiment of a second aspect of the present invention, there is further provided a sensor network with reduced power consumption comprising:
- a plurality of sensors each generating local sensor data; and
- at least one central controller for processing the sensor data transmitted by the sensors to the central controller,
- wherein the central controller calculates a transmission schedule for the sensors on the basis of a correlation between sensor data of different sensors.

In an embodiment of the second aspect of the present invention, the sensor data are transmitted by a sensor to the sensor controller via a wireless data link.

In an embodiment of the second aspect of the present invention, each sensor is powered by a replaceable battery.

In an embodiment of the second aspect of the present invention, the transmission schedule comprises transmission periods each having an assignable number of time slots.

In an embodiment of the second aspect of the present invention, each sensor comprises a memory for storing the generated local sensor data.

In an embodiment of a third aspect of the present invention, there is further provided a controller for a sensor network which receives sensor data transmitted from different sensors of the sensor network and calculates a transmission schedule for the sensors on the basis of a correlation between the received sensor data.

In an embodiment of a fourth aspect of the present invention, there is further provided a sensor with reduced power consumption within a sensor network,
wherein the sensor generates sensor data which are transmitted to a central controller of the sensor network during transmission periods assigned to the sensor by the central controller according to a transmission schedule calculated by the central controller on the basis of a correlation between sensor data received by the central controller from different sensors.

BRIEF DESCRIPTION OF THE DRAWINGS

In the following, embodiments of the present invention are described with reference to the enclosed figures.

DETAILED DESCRIPTION OF THE EMBODIMENTS

Figure 1:
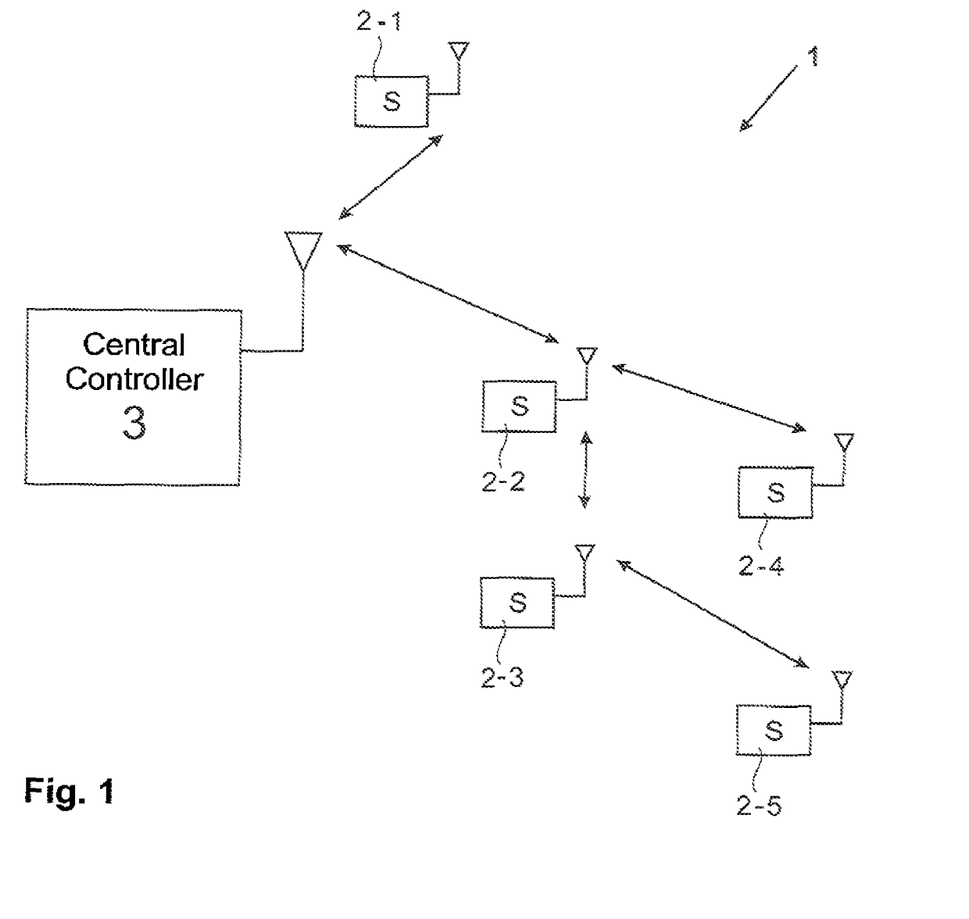
FIG. 1 shows a diagram of an embodiment of a sensor network according to the present invention.

FIG. 1 shows a sensor network 1 according to an embodiment of the present invention comprising a plurality of sensors 2 communicating with each other and a central controller 3 over wireless data links. The sensors 2 can either communicate directly with the central controller 3 or indirectly via other sensors 2. The sensor network 1 is in a preferred embodiment a wireless sensor network using a wireless data transmission protocol, such as 802.15.4 (ZigBee). Any wireless transmission protocol can be employed with the sensor network 1. In an embodiment of the present invention, the sensor network 1 is not restricted to a wireless sensor network. In an alternative embodiment, the sensor network 1 comprises, at least in part, sensors which are connected via wired data transmission lines with each other.

The sensors 2 of the sensor network 1 as shown in FIG. 1 can be sensors of any kind, such as environmental sensors which are distributed across a system to monitor the behaviour of the system. The sensors 2 can be, for example, humidity sensors tracking the humidity in a vineyard or temperature sensors tracking the temperature distribution in the vineyard. Another example for such a wireless network can be a light sensor, tracking the movement of people in an airport. The sensor data generated locally by a sensor 2 is reported back to the central controller 3 which processes the received sensor data. In the given example, the central controller 3 may increase or decrease the spraying of water in some part of the vineyard. In another example, the central controller 3 may process the sensor data to estimate a rent for a business location in an airport based on the traffic of people that passes said location. The sensor network 1 may, in an embodiment of the present invention, have at least one sensor 2 and at least one central controller 3. In an alternative embodiment, the sensor network 1 comprises a plurality of sensors 2 which are widely distributed and at least several central controllers 3.

Figure 2:
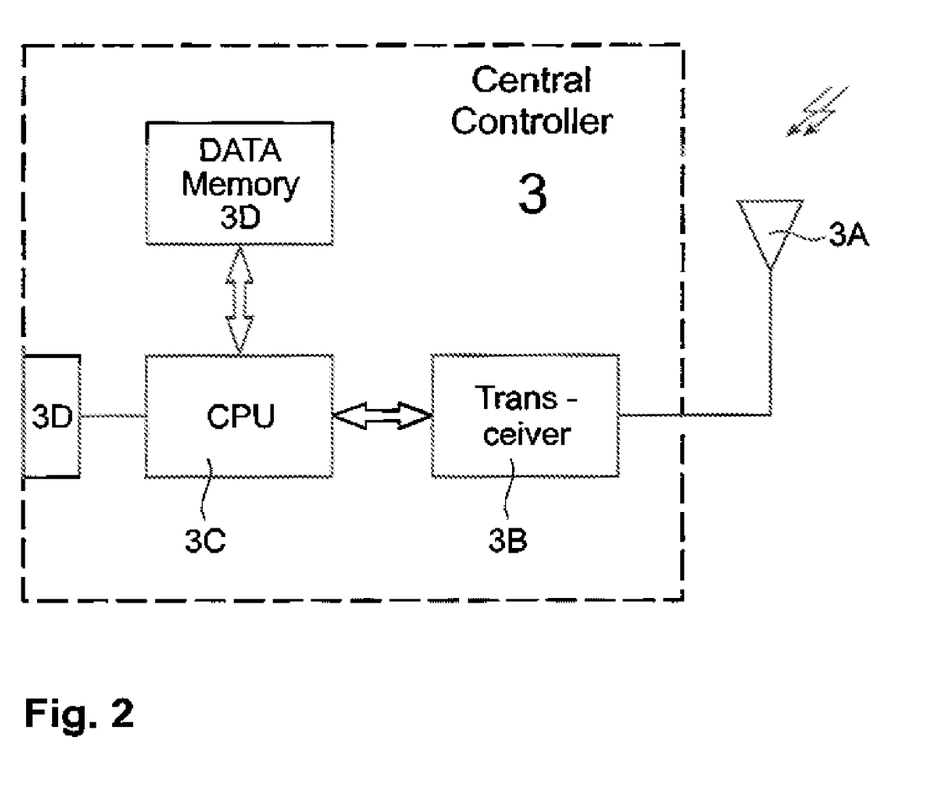
FIG. 2 shows a block diagram of an embodiment of a central controller according to the present invention.

FIG. 2 shows a block diagram of an embodiment of the central controller 3 within the sensor network 1. The central controller 3 comprises an antenna 3A for transmitting and receiving an electromagnetic signal in a predetermined frequency range.

The antenna 3A is connected to a transceiver 3B for processing the electromagnetic signal, such as a radio signal. The transceiver 3B of the central controller 3 is connected to a central processing unit 3C for processing the received sensor data. The central controller 3 may comprise an interface 3D for connecting the central controller 3 to another network, such as a local area network LAN or the Internet. The central controller 3 further comprises a data memory 3D for storing data.

The central controller 3 receives the sensor data transmitted from different sensors 2 of the sensor network 1 and the CPU 3C calculates the transmission schedule for the sensors 2 on the basis of correlation between the received sensor data.

Figure 3:
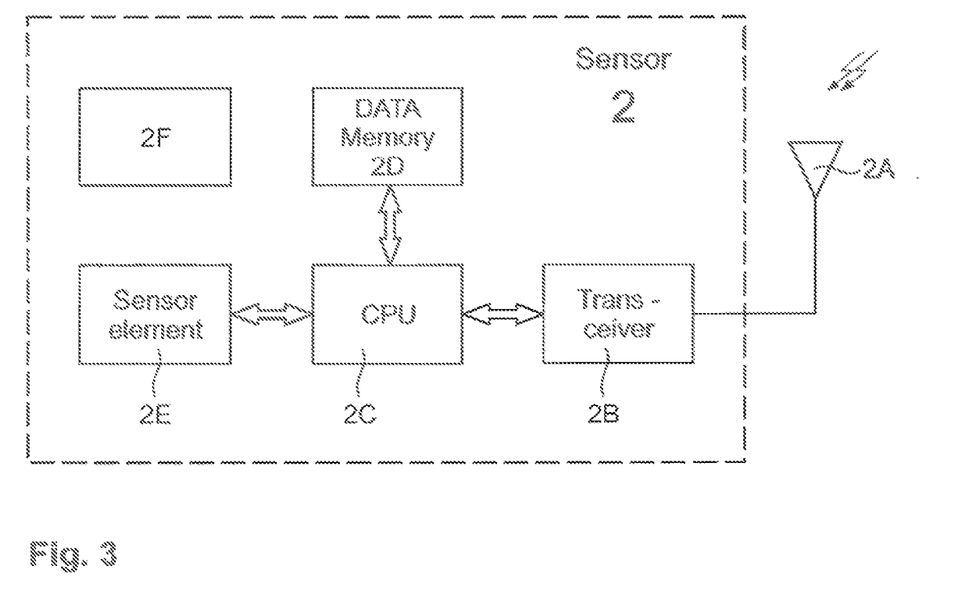
FIG. 3 shows a block diagram of an embodiment of a sensor according to the present invention.

FIG. 3 shows an embodiment of a sensor 2 within the sensor network 1. The sensor 2 comprises an antenna 2A for transmitting and receiving an electromagnetic signal. The antenna 2A is connected to a transceiver 2B of the sensor 2 which in turn is connected to a central processing unit 2C. In a preferred embodiment, the sensor 2 comprises a data memory 2D for storing temporarily data which has been generated locally by a sensor element 2E of the sensor 2. The sensor element 2E performs a transduction of a physical entity, such as the temperature, into an electronic signal and an analog-to-digital conversion of said analog signal into digital sensor data applied to the central processing unit 2C. The sensor 2 further comprises, in one embodiment, a replaceable battery 2F for powering the components of the sensor 2.

The sensors 2 of the sensor network 1 transmit in an initial learning phase sensor data independently from each other to the central controller 3. The central controller 3 then calculates on the basis of the sensor data received during the initial learning phase a correlation between the sensor data of the different sensors 2.

In a further step, the central controller 3 calculates a transmission schedule which is made up of time periods, such that sensor 2 which show strong or high correlation do not transmit sensor data to the central controller 3 during the same time period. After the calculation of the transmission schedule, the central controller 3 assigns transmission periods to each sensor 2 for transmitting this sensor data to the central controller 3 according to the calculated transmission schedule.

Sensors 2 with a high correlation are assigned by the central controller 3 occasionally the same transmission period for transmitting sensor data to monitor whether the previous calculated correlation between the sensors 2 is still valid. The assignment of the same transmission period is performed in one embodiment periodically, e.g. every 10 seconds, every 100 seconds or every hour.

In any system, such as a vineyard or an airport, some sensors 2 have a strong correlation. For example, it is likely but not certain, that locations within a vineyard which are close to each other have similar temperatures or humidity. Likewise, in an airport, if a first sensor at one end of the corridor indicates a high number of people going by, a second sensor that is located at the other end of said corridor is likely to indicate the same number of people passing by.

As all the sensor data from the different sensors 2 are transmitted to the central controller 3, a covariance between distinct sensors is calculated with a method according to an embodiment of the present invention in a predetermined learning period. The calculated covariance is not limited to sensors 2 of the same type. For example, a light sensor and a temperature sensor might be strongly positively correlated because during day time, the light intensity and the temperature of the environment increase. The calculated covariance is not always positive and, for example, when a restaurant A with a lot of people in it, it may always be the case, that another restaurant B has few. In another example, a first side of a hill being in the sun has a high temperature whereas the shadow side of this hill will have a low temperature.

The coefficient correlation between two data sets of N values $x_j=\{x0j, \ldots, x_1-1j\}$ and $x_k=\{x0k, \ldots, x_n-1k\}$, is given by the formula:

$$r_{jk} = \frac{\sum_i (x_{ij} - X_j)(x_{ik} - X_k)}{\sigma_j \sigma_k}$$

Where XJ, Xk are the mean values of the xj,xk sets and sigmaj, sigmak are the standard deviation of the xj,xk sets.

For each point in a data set its variance from an average point in said data set, the mean variance, is measured. The mean variance gives a measure of how different a point in the data set is, but its values depend on the units which are measured, i.e. light, heat, number of people etc. Accordingly, in an embodiment of the present invention, a standardized value of difference by division of the standard deviation of the data set is calculated, i.e. a measure of how much the data set as a whole is spread out. The standard score of a data value indicates how much the data value stands out within that data set, i.e. a standard score of 2.0 implies that the data point varies from the mean value by twice the standard deviation. This is independent of the units the data set is measured in. Multiplying standard scores together, summing the product and then dividing by the number of data points gives a measure of how tightly correlated the data sets are.

For example, the correlation values indicated in the above formula allows, for example, to say that if a heat sensor is recording a value of n, then another light sensor is with 70% certainty recording a value of m. Accordingly, the correlation allows a fairly good guess about the value of a given sensor at a certain moment if the value of another sensor at the same moment with which the first sensor is strongly correlated is known. The sensor data generated by sensors 2 within a sensor network 1 according to an embodiment of the present invention, are not fixed data sets. The correlation which is valid in the past, may not be valid in the future. For example, different parts of a vineyard may be correlated in different ways in different seasons.

With the method according to an embodiment of the present invention, in an initial learning phase, the sensors 2 transmit the data independently of each other. The central controller 3 then calculates a correlation between the sensors 2 based on the data obtained from the sensors 2 during this learning period. On the basis of the calculated correlation between the sensors 2, the central controller 3 then calculates a transmission schedule. The calculated transmission schedule is flooded by the central controller 3 to the sensor 2 in a broadcast message.

In one embodiment of the method according to the present invention, the central controller 3 calculates a correlation between all sensors 2, i.e. for each single sensor 2-*i*, the correlation to each other respective sensor 2-*i* is within the same sensor network 1. A number N of sensors 2 gives a N×N correlation coefficient matrix. On the basis of the calculated correlation matrix, the central controller 3 then calculates the transmission schedule. This transmission schedule is calculated such that sensors 2 with strong or high correlation do not transmit sensor data during the same time period. When, for instance, two sensors 2-1, 2-2 are scheduled originally to transmit data to a central controller 3 every second and it is determined that both sensors 2-1, 2-2 have a strong correlation with their correlation coefficient exceeding a predetermined adjustable threshold value of, for instance 95%, the central controller 3 may send a control message to both sensors 2-1, 2-2 such that the second sensor 2-2 will only transmit its sensor data now only every ten seconds. The strongly correlated first sensor 2-1 will continue to send its sensor data with a rate of one data set/sec. In this way, the power consumption of the second sensor 2-2 is significantly reduced. Accordingly, in a group of strongly correlated sensors 2, one sensor of the group continues to transmit its sensor data at a normal transmission rate of, for example, one data transmission/sec. The other sensors of the strongly correlated sensor group will reduce their transmission frequency to save power. The reference sensor which transmits its data regularly, for example, one sensor data set/sec., may be replaced after a predetermined time by another sensor 2 of the same group taking over its position, whereas the previous reference sensor becomes a normal sensor of this group and transmits its data at a reduced data transmission frequency. In this manner, it is assured that sensors 2 of a correlated group do not consume their power completely at a very early stage.

Sensors 2 of the same group, i.e. strongly correlated sensors, are occasionally scheduled by the central controller 3 to send sensor data at the same time period to determine if the correlation is still valid. In a possible embodiment, the strongly correlated sensors are scheduled by the central controller 3 to send data at the same time period on a regular basis, i.e. periodically, e.g. every second, every 10 seconds, every 100 seconds or every hour. If the correlation drifts too much, the central controller 3 recalculates the time schedule. The central controller 3 determines that a correlation between sensors 2 is no longer valid when the difference between the actual calculated correlation and the previous calculated correlation exceeds an adjustable threshold value. The recalculated time schedule is flooded by said central controller 3 to the sensors 2 by a broadcast message.

In an embodiment of the method according to the present invention, each sensor 2 stores the determined sensor data locally in its data memory 2D when the sensor 2 is not transmitting the sensor data to the central controller 3.

In an embodiment of the method according to the present invention, the sensor data of a non-transmitting first sensor are interpolated from sensor data of at least one transmitting second sensor which has a high correlation with the first sensor.

If the central controller 3 notices that a previous correlation is no longer valid, it asks for the sensor data stored locally by the sensors 2 to be sent in order to revise data for said sensor 2. Accordingly, when it is determined that a correlation between two sensors 2i, 2j is no longer valid, the central controller 3 requests both sensors 2i, 2j to transmit the locally stored sensor data to the central controller 3.

Figure 4:
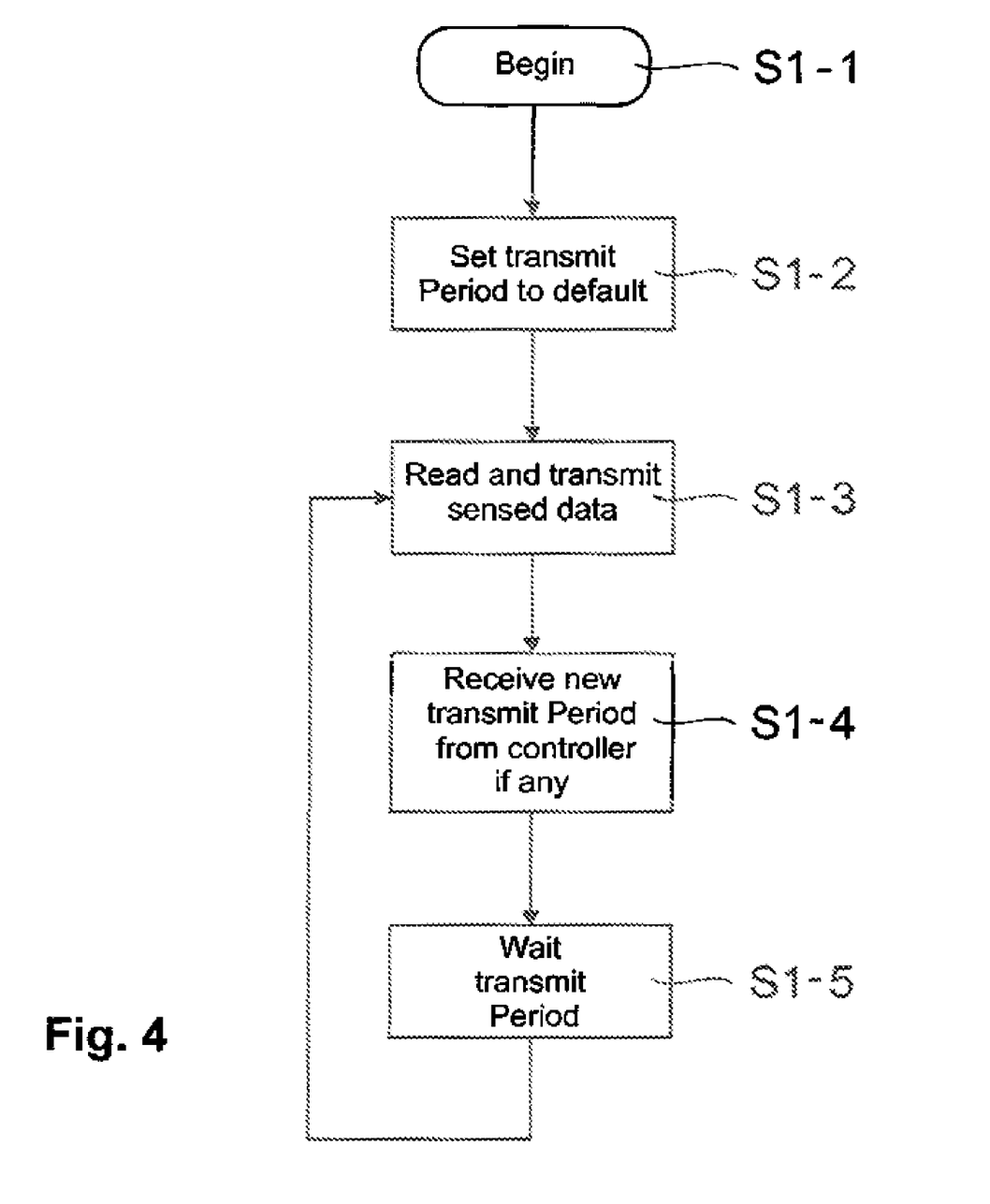
FIG. 4 shows a flowchart for illustrating an embodiment of the method according to the present invention.

FIG. 4 shows a flowchart for illustrating an embodiment of the method according to the present invention. The flowchart of FIG. 4 shows a process within a sensor 2 according to an embodiment of the present invention.

The process comprises the following steps. After a start step S1-1, the transmission period for the sensor 2 is set in a step S1-2 to a predetermined default value of, for instance, one data transmission/sec.

In a further step S1-3, the sensor 2 generates a sensor data and transmits the sensor data to the central controller 3.

The central controller 3 calculates a transmission schedule on the basis of a correlation between sensor data transmitted from the sensors and assigns a transmission period to each sensor 2.

In a step S1-4, the sensor 2 receives the assigned transmission period from the central controller 3.

In a further step S1-5, the sensor 2 waits until the assigned transmission period has been expired before the sensor 2 transmits the generated sensor data in step S1-3.

Figure 5:
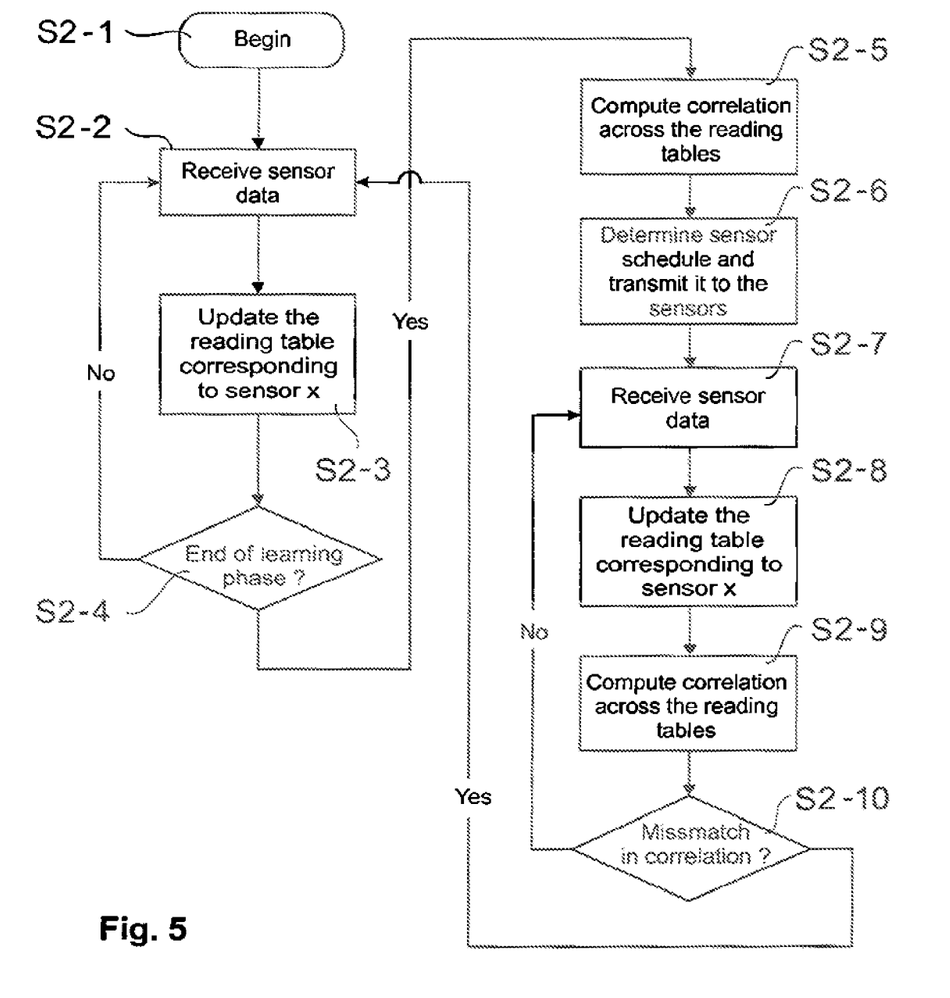
FIG. 5 shows a further flowchart for illustrating an embodiment of the method according to the present invention.

FIG. 5 shows a further flowchart for illustrating an embodiment of the method according to the present invention. The process shown in FIG. 5 is performed within the central controller 3.

After a start step S2-1, the central controller 3 receives in a step S2-2 further data from a sensor 2 within the network 1.

In a further step S2-3, the central controller 3 updates a reading table of the respective sensor stored in the data memory 3D of the central controller 3.

Figure 6:
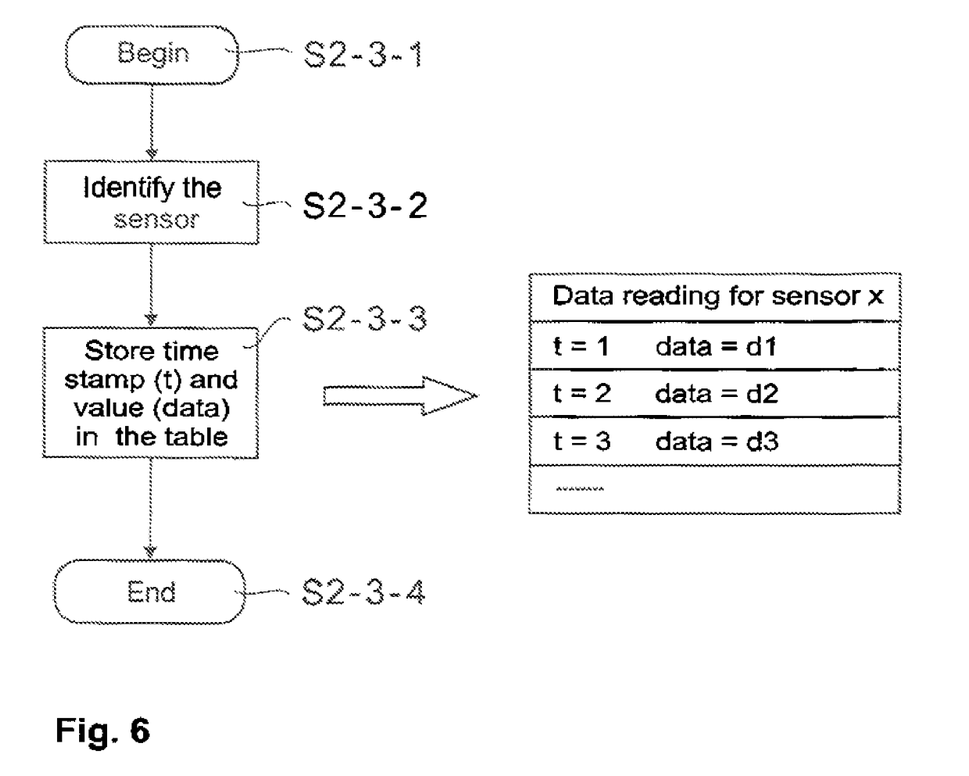
FIG. 6 shows a further flowchart for illustrating the functionality of an embodiment of the method according to the present invention.

The updating of the reading table in step S2-3 is shown in more detail in FIG. 6. As can be seen from FIG. 6, after a start step, step S2-3-1, the identity of the sensor 2 is identified by the central controller 3 in step S2-3-2. The central controller 3 and the sensor 2 of the sensor network 1 exchange data by exchanging data packets comprising header data and payload data.

In an embodiment according to the method of the present invention, the central controller 3 receives data packets from a sensor 2 as payload of a data packet having a header section comprising a sensor ID of the sensor 2.

In a preferred embodiment, the central controller 3 further comprises a stored table indicating the location of each sensor 2 within the network 1, i.e. the coordinates of each sensor 2 are stored also in the data memory 3D of the central controller 3.

After the identity of the sensor 2 has been determined in step S2-3-2, the central controller 3 stores in step S2-3-3 a time stamp and stores the corresponding sensor data in a table of the sensor. There is a data reading table provided in the data memory 3D of the central controller 3 for each sensor 2 of the network 1. The subroutine stops in step S2-3-4.

After the reading table of the sensor 2 has been updated in step S2-3, the central processing unit 3C of the central controller 3 determines in step S2-4 as shown in FIG. 5 whether a learning phase has been expired or not.

Figure 7:
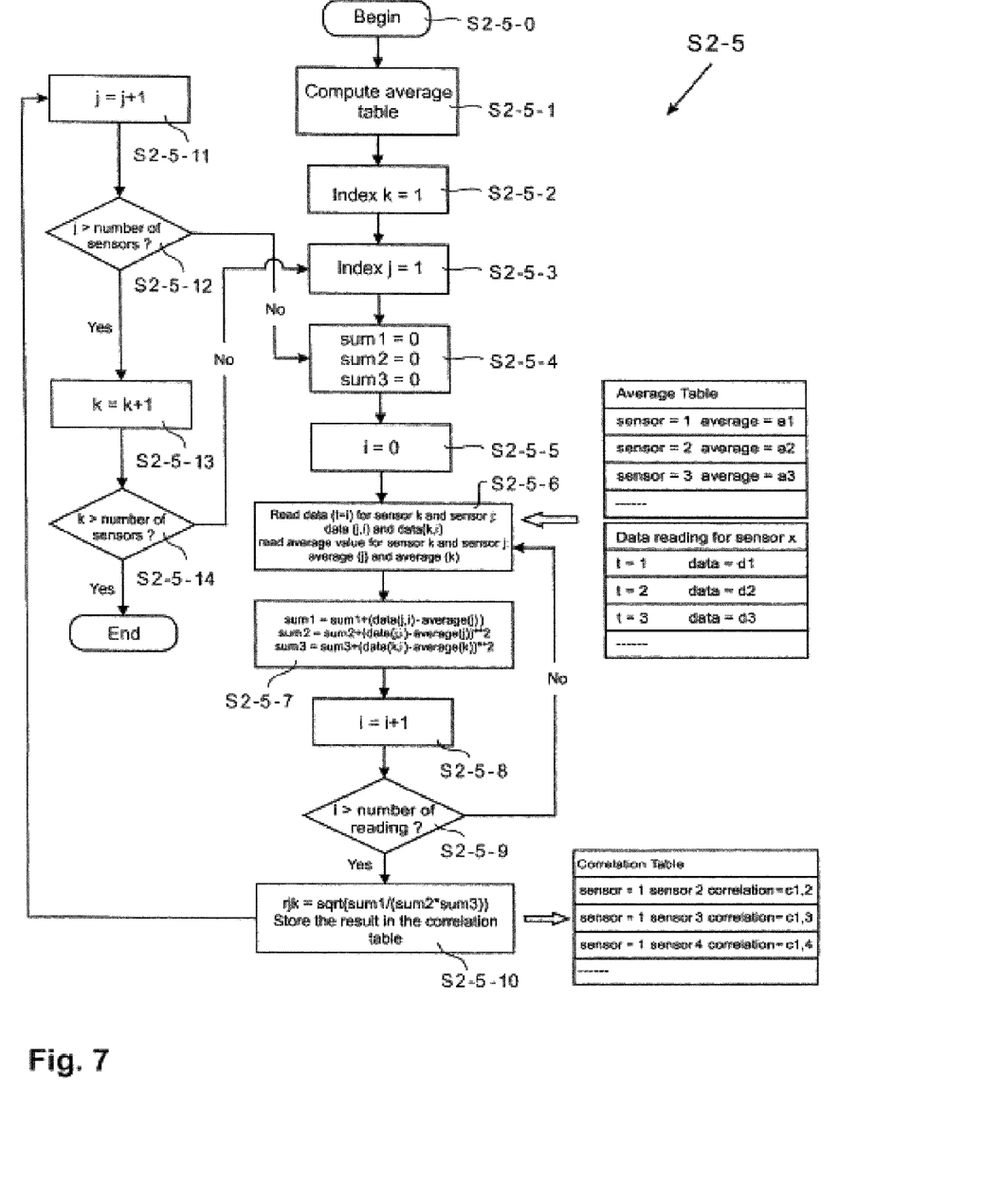
FIG. 7 shows a further flowchart for illustrating an embodiment of the method according to the present invention.
Figure 8:
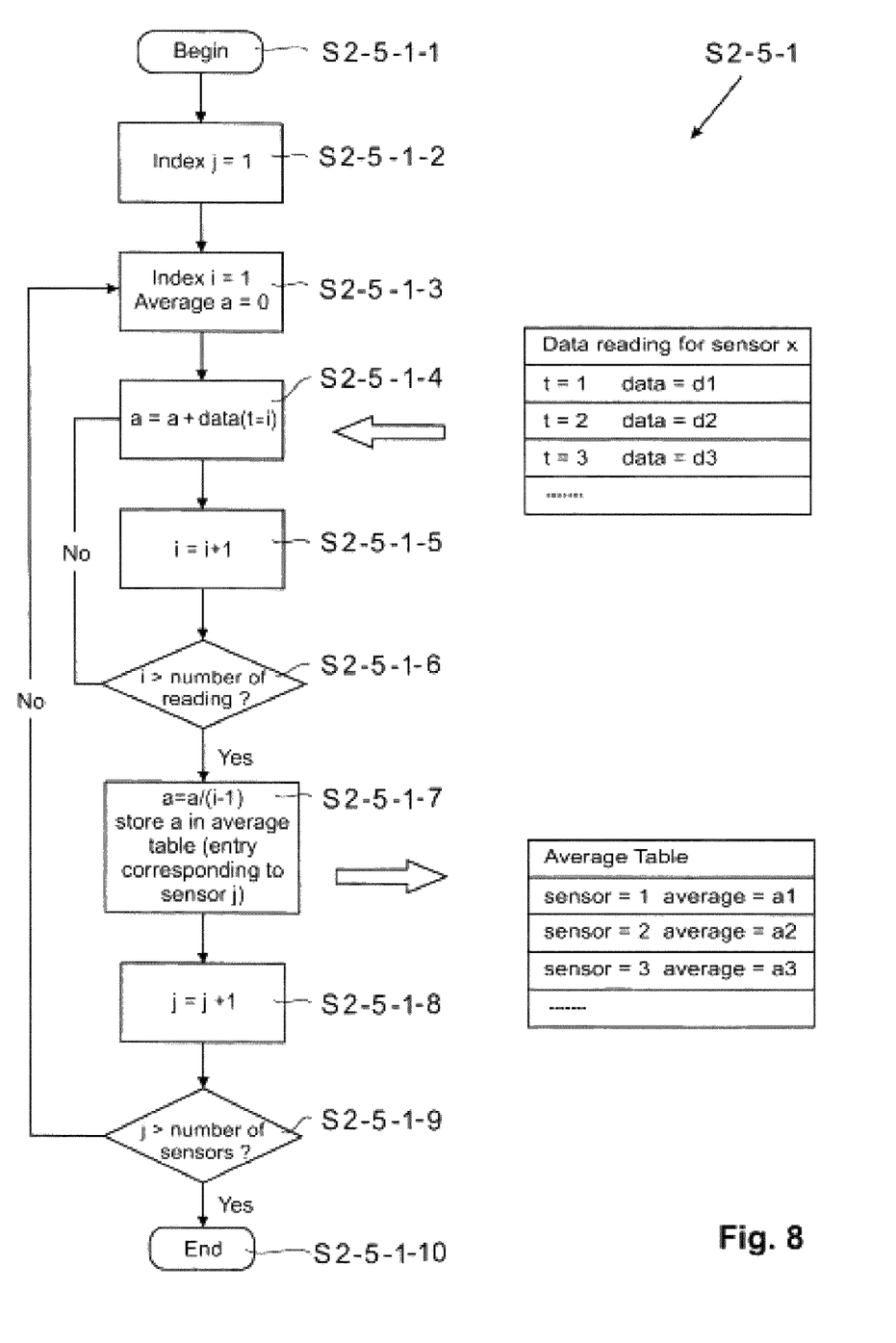
FIG. 8 shows a further flowchart for illustrating an embodiment of the method according to the present invention.

When the learning phase has expired, the central controller 3 computes in step S2-5 a correlation across the reading tables as shown in FIG. 7. The correlation computation process as shown in FIG. 7 implements the above mentioned formula for calculation of a coefficient correlation. The correlation computation comprises the computation of an average table in step S2-5-1 as shown in FIG. 8. For each sensor 2, an average value is calculated by the central controller 3 on the basis of the sensor data received from the sensor 2 and stored in the corresponding data reading table. With the algorithm as shown in FIG. 7, a correlation coefficient $r_{jk}$ between any pair of sensors 2k and 2j is calculated and stored in a correlation table indicating for each sensor pair 2j, 2k the corresponding correlation. The correlation table is stored in the data memory 3D of the central controller 3.

FIG. 7 shows computation of correlation coefficients on the basis of the reading tables in step S2-5 as shown in FIG. 5 in more detail.

After a starting step S2-5-0, an average table is computed in step S2-5-1, wherein the computation of the average table is shown in the flowchart of FIG. 8.

In step S2-5-2, an index variable k is set to one. In step S2-5-3, further, an index variable j is set to one.

In step S2-5-4, variables Sum1, Sum2, Sum3 are initialized to zero. In step S2-5-5, a further index i is set to zero. In Step S2-5-6, data is read out for sensor k and sensor j, i.e. data (j, i) and data (k, i). Subsequently, an average value for sensor k and sensor j is read, i.e. average (j) and average (k). These average values are read out from the average table calculated in step S2-5-1.

In a further step S2-5-7, the following calculation is performed:

$$Sum1 = Sum1 + (data(j,i) - average(j))$$

$$Sum2 = Sum2 + (data(j,i) - average(j))^2$$

$$Sum3 = Sum3 + (data(k,i) - average(k))^2$$

In a further step S2-5-8, the index variable i is incremented and it is checked in step S2-5-9, whether index variable i is higher than the number of readings. If this is the case, the correlation coefficient $r_{jk}$ between the two sensors, i.e. sensor k and sensor j, is calculated in step S2-5-10:

$$r_{jk} = SQRT(Sum1/(Sum2*Sum3))$$

The calculated correlation coefficient $r_{jk}$ is stored as a result in a corresponding correlation table for the two sensors.

After the calculation of the correlation coefficient $r_{jk}$, the second index variable j is incremented in step S2-5-11.

If in step S2-5-12 it is decided that index variable j is higher than the number of the sensors 2, the process continues with step S2-5-13, where index variable k is incremented. If index variable j is equal or smaller than the number of the sensors 2 in the sensor network 1, then the process continues with step S2-5-4.

In step S2-5-14, it is checked, whether index variable k is higher than the number of the sensors in the sensor network 1.

If index variable k is smaller or equal to the number of the sensors 2 in the sensor network 1, the process continues with step S2-5-3. If index variable k exceeds the number of the sensors 2 in the sensor network 1, the procedure is finished and step S2-5 in FIG. 5 is completed.

FIG. 8 shows the calculation of the average table in step S2-5-1 shown in FIG. 7 in detail. The subroutine starts in step S2-5-1-1. In step S2-5-1-2, an index variable j is set to one. In step S2-5-1-3, an index variable i is set to one and an average variable a is initialized to zero.

In step S2-5-1-4, data is read out for the corresponding sensor x and the variable a is updated as following:

$$a = a + \text{data}(t=i)$$

Then the index variable i is incremented in step S2-5-1-5.

In step S2-5-1-6, it is checked whether i is higher than the number of readings. As long as i is smaller than the number of readings, a loop consisting of step S2-5-1-4, S2-5-1-5 and step S2-5-1-6 is run through.

When i exceeds the number of readings, the average variable a is calculated as following in step S2-5-1-7:

$$a = a/(i-1)$$

The calculated average variable a is stored in an average table for the corresponding sensor 2.

In step S2-5-1-8, the index variable j is incremented.

In step S2-5-1-9 it is checked whether the incremented index variable j is higher than the number of sensors 2 in the sensor network 1. As long as index variable j is smaller than the number of sensors 2, the process loops back to step S2-5-1-3. If index variable j exceeds the number of the sensors in the sensor network 1, the subroutine is finished in step S2-5-1-10.

Figure 9:
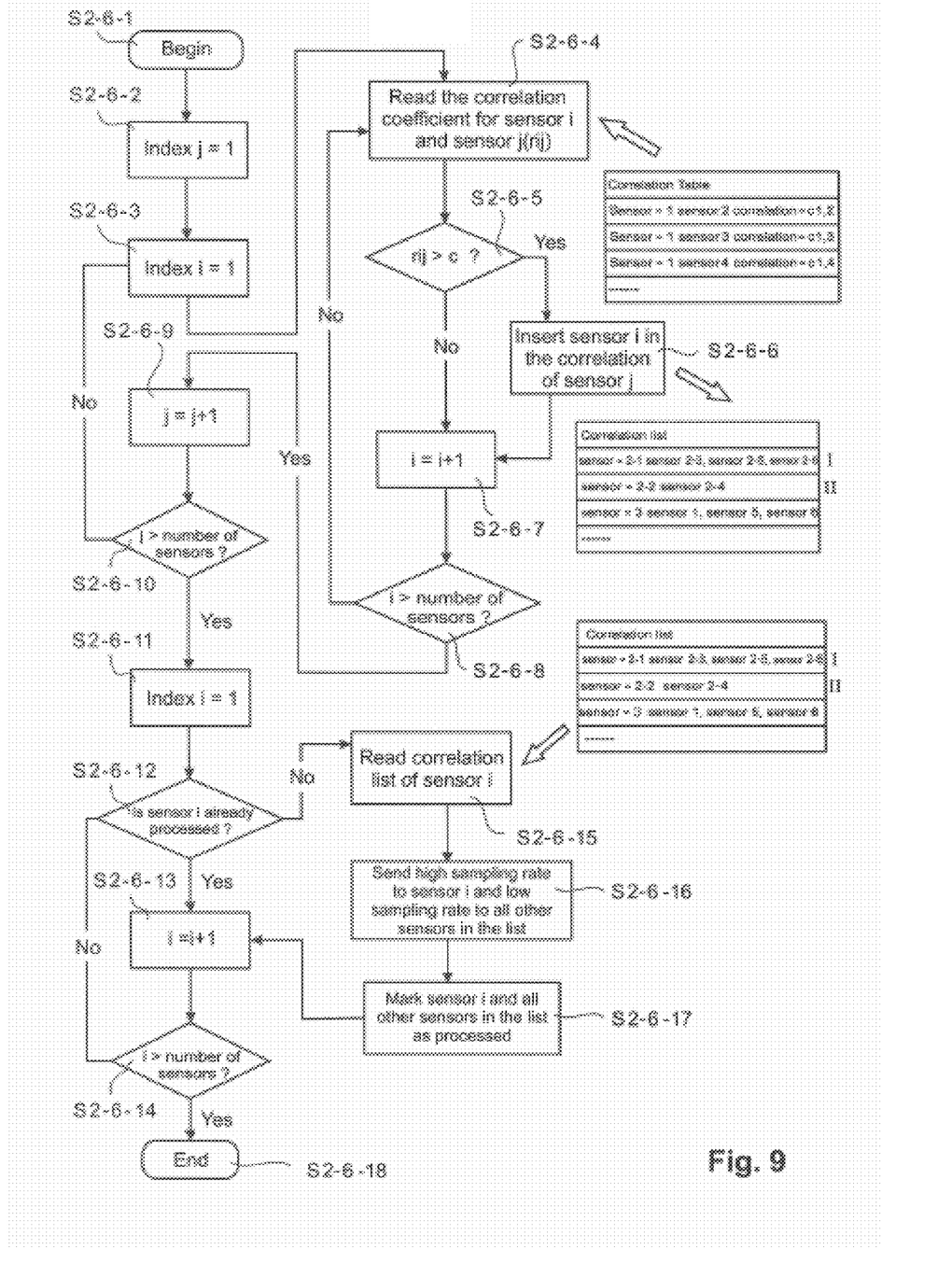
FIG. 9 shows a further flowchart for illustrating an embodiment of the method according to the present invention.

The determination of the sensor schedule in step S2-6 and as shown in FIG. 5 is shown in detail in FIG. 9. The subroutine starts in step S2-6-1. In step S2-6-2, an index variable j is set to one.

In step S2-6-3, a further index variable i is set to one.

In step S2-6-4, the correlation coefficient $r_{ij}$ for sensor i and sensor j is read from the correlation table generated in step S2-5-10 as shown in FIG. 7.

In step S2-6-5, it is decided whether the correlation coefficient $r_{ij}$ for the sensor pair sensor i, sensor j is higher than an adjustable threshold value C. If this is the case, sensor i is inserted in the correlation list of sensor j in step S2-6-6. Otherwise, sensor i is not inserted in the correlation list of sensor j. In the next step S2-6-7, the index variable i is incremented. In step S2-6-8, it is checked whether index variable i is higher than the number of the sensors 2 in the sensor network 1. If index variable i is smaller or equal to the number of the sensors 2 in the sensor network 1, the process loops back to step S2-6-4. Otherwise, the process continues with step S2-6-9, i.e. the index variable j is incremented. In step S2-6-10, it is checked whether index variable j is higher than the number of the sensors 2 in the sensor network 1. As long as index variable j is smaller or equal to the number of the sensors 2 in the sensor network 1, the process loops back to step S2-6-3. If index variable j is higher than the number of the sensors 2 in the sensor network 1, index variable i is reset to one in step S2-6-11. Then, it is decided in step S2-6-12 if sensor i is already processed or not. If sensor i has already been processed, index variable j is incremented in step S2-6-13. Then, it is decided whether index variable j has exceeded the number of the sensors 2 in the sensor network 1 in step S2-6-14. As long as index variable j is smaller or equal than the number of the sensors in the sensor network 1, the process loops back to step S2-6-12. Otherwise, the process stops in step S2-6-18. If in step S2-6-12, it is decided that the sensor i has not already been processed, the process continues in step S2-6-15 by reading out the correlation list of sensor generated in step S2-6-6. In step S2-6-16, a high sampling rate is sent to sensor i and a low sampling rate is sent to all other sensors 2 in the correlation list of sensor i. In the following step S2-6-17, sensor i and all other sensors 2 in the correlation list of sensor i are marked to be processed and the subroutine continues with step S2-6-13.

As can be seen from FIG. 5, after the calculation of the correlation table on the basis of the reading tables in step S2-5, the central controller 3 determines in step S2-6 a data transmission schedule for the sensors 2 of the network 1. The calculation of the data transmission time schedule is shown in detail in FIG. 9.

As can be seen from FIG. 9, the central controller 3 reads the correlation coefficient of a pair of sensors i, j and compares the calculated correlation coefficient $r_{ij}$ of this pair of sensors 2j, 2i with a correlation threshold value C in step S2-6-5. If the calculated correlation exceeds the threshold value C, it is decided that both sensors 2i, 2j correlate strongly with each other and belong to the same group of sensors within a correlation list. In the example shown in FIG. 9, sensors 2-1, 2-3, 2-5, 2-6 from a first group I of sensors are correlated with each other. The other sensors 2-2, 2-4 form another group II of strongly correlated sensors. In step S2-6-1 until step 2-6-10 all sensors are sorted into a group of sensors within the correlation list stored in the data memory 3D of the central controller 3.

After that, the central controller 3 calculates a data transmission period for all sensors 2 on the basis of the generated correlation list in step S2-6-11 to step S2-6-18. In the embodiment shown in FIG. 9, a first sensor of each group sends its sensor data with a higher sampling rate of, e.g. one data set/sec. and the remaining sensors of the same group transmit their sensor data only at a rate of one data set/ten seconds. In the given example, sensor 2-1 of group I transmits its sensor data, for instance, at a sampling rate of one data set/sec. whereas the remaining sensors 2-3, 2-5, 2-6 of the correlated group I transmit only data a range of one data set/ten seconds.

In the same manner, a first sensor 2-2 of the other group II transmits at a high transmission rate of one data set/sec. whereas the remaining sensor 2-4 of the same group II transmits sensor data at a comparably lower rate of, e.g. one/ten seconds. The transmission schedule calculated by the CPU 3C of the central controller 3 is made up of time periods. The transmission schedule is calculated such that sensors 2 with a high correlation do not transmit sensor data to the central controller 3 during the same time period.

Referring back to FIG. 5, after the calculation and the assignment of the transmission periods to each sensor 2 according to the calculated transmission schedule in step S2-6 as shown in FIG. 9, the central controller 3 performs a monitoring of the correlations in steps S2-7 to S2-10 as can be seen in FIG. 9. In the given example, one sensor of group I, e.g. sensor 2-1, transmits at a rate of one data set/each sec., whereas the remaining sensors 2-3, 2-5, 2-6 transmit data at a rate of one/ten sec. Accordingly, every ten seconds, the central controller 3 will receive a sensor data in step S2-7 from all sensors 2 within the same group to monitor whether the correlationship between the sensors 2 of this group is still valid.

In step S2-8, the central controller 3 updates the reading table of the sensors 2 as shown in FIG. 6. After this, the central controller 3 computes a correlation across the reading tables in step S2-9 as shown in FIG. 7.

In step S2-10, the central controller 3 checks whether a mismatch in correlation exists or not. The central controller 3 determines that the correlation $r_{jk}$ between two sensors $2j$, $2k$ is no longer valid if the difference between the actual calculated correlation in step S2-9 and the previous correlation in step S2-5 exceeds a threshold value. In case that the correlation between the sensors $2j$, $2k$ is no longer valid, the central controller 3 recalculates a transmission schedule.

In the embodiment shown in FIG. 5, after detection of a mismatch in correlation, the learning phase is re-entered, i.e. steps S2-2 to S2-4.

An embodiment of the present invention can be applied to any sensor network, e.g. any wireless sensor network. The wireless network may be an IEEE 802.15.4 (ZigBee) network or a Bluetooth network.

In an embodiment of the method according to the present invention, the data transmission frequency is calculated in response to the calculated correlation value. When the correlation value is decreasing the frequency of overlapping time periods to monitor whether a correlation is still valid can be increased in one embodiment of the method according to the present invention. The method for reducing power consumption of sensors within a sensor network 1 can be in particular applied to a multi-hop network.

In an embodiment of the method according to the present invention, the central controller 3 also monitors whether a sensor 2 is still active, i.e. the central controller 3 further controls whether the battery of said sensor 2 still supplies the sensor 2 with sufficient power.

In an embodiment of the method according to the present invention, the sensor 2 further sends a warning message to the central controller 3 in case that his battery is to be expected to fail soon.

The invention claimed is:

1. A method for reducing power consumption of sensors provided for sensing conditions within a sensor network comprising the steps of:
a central controller receiving sensor data comprising current sensed condition data transmitted from a plurality of different sensors;
said central controller calculating a correlation between said plurality of different sensors on the basis of the received sensor data and calculating a transmission schedule for said sensors on the basis of a correlation between sensor data comprising sensed condition data transmitted from said plurality of different sensors to the central controller, wherein the transmission schedule is made up of time periods, such that sensors with a high correlation having a correlation coefficient exceeding a predetermined adjustable threshold value do not transmit sensor data to said central controller during the same time period and wherein sensors without a high correlation transmit sensor data to the central controller substantially during the same time period; and
wherein the central controller assigns transmission periods to each sensor for transmitting sensor data to said central controller according to the calculated transmission schedule.

2. The method according to claim 1, wherein, in an initial learning phase, the sensors transmit phase sensor data independently to said central controller and said central controller calculates a correlation between said sensors based on the received sensor data.

3. The method according to claim 1, wherein the central controller has another mode of operation for confirming correlation of sensors with a high correlation whereby said sensors with a high correlation are occasionally assigned the same transmission period for transmitting sensor data for said central controller to monitor whether a previous calculated correlation between said sensors is still valid.

4. The method according to claim 3, wherein, the central controller determines that a correlation between sensors is no longer valid when the difference between the actual calculated correlation and the previous calculated correlation exceeds a threshold value.

5. The method according to claim 4, wherein the central controller recalculates a transmission schedule when the correlation between two sensors is no longer valid.

6. The method according to claim 1, wherein the calculated transmission schedule is flooded by said central controller to said sensors.

7. The method according to claim 1, wherein each sensor stores sensed condition sensor data locally when the sensor is not transmitting said sensor data to said central controller.

8. A method for reducing power consumption of sensors provided for sensing conditions within a sensor network comprising the following steps:
(a) transmitting in an initial learning phase sensor data comprising sensed condition data from a plurality of different sensors independently of each other to a central controller;
(b) calculating on the basis of the sensor data received by said central controller a correlation between said plurality of different sensors;
(c) calculating a transmission schedule made up of time periods, such that sensors with a high correlation having a correlation coefficient exceeding a predetermined adjustable threshold value do not transmit sensor data to said central controller during the same time period and wherein sensors without a high correlation transmit sensor data to the central controller substantially during the same time period; and
(d) assigning transmission periods to each sensor for transmitting sensor data according to the calculated transmission schedule.

9. A sensor network with reduced power consumption comprising:
(a) a plurality of sensors provided for sensing conditions each generating local sensor data; and
(b) at least one central controller for processing sensor data comprising current sensed condition data transmitted by a plurality of different sensors to said central controller, wherein the central controller calculates a correlation between said plurality of different sensors on the basis of the received sensor data and calculates a transmission schedule for said sensors on the basis of a correlation between sensor data of different sensors, wherein the transmission schedule is made up of time periods, such that sensors with a high correlation having a correlation coefficient exceeding a predetermined adjustable threshold value do not transmit sensor data to said central controller during the same time period and wherein sensors without a high correlation transmit sensor data to the central controller substantially during the same time period;
and wherein the central controller assigns transmission periods to each sensor for transmitting sensor data to said central controller according to the calculated transmission schedule.

10. The sensor network according to claim 9, wherein the sensor data are transmitted by a sensor to said central controller via a wireless data link.

11. The sensor network according to claim 9, wherein each sensor is powered by a replaceable battery.

12. The sensor network according to claim 9, wherein each sensor comprises a memory for storing the generated local sensor data.

13. A central controller for a sensor network having a plurality of sensors for sensing conditions comprising:
- a receiver for receiving sensor data comprising current sensed condition data transmitted from different sensors of said sensor network; and
- processing component for determining a correlation between received sensor data comprising sensed condition data received from different sensors and for generating a transmission schedule for said sensors on the basis of a correlation between the received sensor data, wherein the transmission schedule is made up of time periods, such that sensors with a high correlation having a correlation coefficient exceeding a predetermined adjustable threshold value do not transmit sensor data to said central controller during the same time period and wherein sensors without a high correlation transmit sensor data to the central controller substantially during the same time period; and
- wherein the central controller assigns transmission periods to each sensor for transmitting sensor data to said central controller according to the calculated transmission schedule.

14. The central controller of claim 13 wherein said processing component further comprises communication component for communicating the transmission schedule to the sensors.

* * * * *